United States Patent
Dalla Fontana et al.

(10) Patent No.: US 11,723,373 B2
(45) Date of Patent: Aug. 15, 2023

(54) FOOD DOUGH-STRETCHING MACHINE

(71) Applicant: ECOR International SPA, Schio (IT)

(72) Inventors: Enrico Dalla Fontana, Arsiero (IT); Luca Smiderle, Schio (IT)

(73) Assignee: ECOR International SPA, Schio (IT)

( * ) Notice: Subject to any disclaimer, the term of this patent is extended or adjusted under 35 U.S.C. 154(b) by 297 days.

(21) Appl. No.: 17/259,833

(22) PCT Filed: Jul. 26, 2019

(86) PCT No.: PCT/IB2019/056391
§ 371 (c)(1),
(2) Date: Jan. 12, 2021

(87) PCT Pub. No.: WO2020/021502
PCT Pub. Date: Jan. 30, 2020

(65) Prior Publication Data
US 2021/0235707 A1    Aug. 5, 2021

(30) Foreign Application Priority Data

Jul. 27, 2018 (IT) .................... IT102018000007562

(51) Int. Cl.
*A21C 11/00* (2006.01)
*A21D 13/41* (2017.01)
*A21D 8/02* (2006.01)

(52) U.S. Cl.
CPC .............. *A21C 11/006* (2013.01); *A21D 8/02* (2013.01); *A21D 13/41* (2017.01)

(58) Field of Classification Search
CPC ........ A21C 11/006; A21C 11/004; A21D 8/02
(Continued)

(56) References Cited

U.S. PATENT DOCUMENTS

| 6,364,653 B1 | 4/2002 | Sirois |
| 2011/0059209 A1 | 3/2011 | Khatchadourian |

FOREIGN PATENT DOCUMENTS

| EP | 1 129 621 A1 | 9/2001 |
| WO | 2015/115220 A1 | 8/2015 |

OTHER PUBLICATIONS

JP4814011B2—Machine translation (Year: 2011).*
(Continued)

*Primary Examiner* — Subbalakshmi Prakash
(74) *Attorney, Agent, or Firm* — Workman Nydegger

(57) ABSTRACT

A dough-stretching machine, which is particularly adapted to stretch pizza dough, includes a frame associated with which are a support plane for the mass of dough to be stretched; a dough-stretching unit arranged at the top and coaxially to the support plane according to the defined vertical axis of the frame; movement apparatus for moving the support plane towards/away from the dough-stretching unit. The dough-stretching unit includes a modelling body configured to come into contact with the mass of dough; a plate in which a plurality of radial grooves are identified, each of which slidably houses a modelling element for the mass of dough; kinematic apparatus adapted to move the modelling elements along the radial grooves towards the vertical axis or away from the axis itself. The kinematic apparatus comprising a threaded shaft having one end operatively connected to motorisation and the opposite end rotatably associated with the plate; a central core provided with a nut fixed on the threaded shaft; a plurality of rods each having one end hinged to one of the modelling elements and the opposite end hinged to the central core.

10 Claims, 10 Drawing Sheets

(58) Field of Classification Search
USPC .......................................................... 426/496
See application file for complete search history.

(56) References Cited

OTHER PUBLICATIONS

International Search Report and Written Opinion dated Nov. 18, 2019, issued in PCT Application No. PCT/IB2019/056391, filed Jul. 26, 2019.

* cited by examiner

FOOD DOUGH-STRETCHING MACHINE

BACKGROUND OF THE INVENTION

1. The Field of the Invention

The present invention relates to an improved machine for stretching a mass of food dough, in particular for stretching a mass of pizza dough.

2. The Relevant Technology

Various kinds of foods are made with food dough, which is shaped to form an essentially flat structure, such as, for example, pizzas, wraps, focaccia bread, Arab and pita bread.

To ensure that such foods are not only tasty, but also aesthetically pleasing, in addition to preparing an optimum mixture, it is also necessary to stretch it adequately.

Various methods can be used to stretch the food dough.

One first method consists of arranging and stretching the mixture on a bearing plane, preferably made of wood or marble, using a wooden rolling pin.

The rolling pin is used primarily to stretch a piece of dough having contained dimensions, for which no particular thinness is required.

In particular, after dusting the plane with flour, the mixture is placed in the middle, and compressed with the rolling pin to reduce it, trying to keep it in the desired shape.

Then, the rolling pin is rolled over the dough, expanding it even more, sliding the hands over the rolling pin with an outward movement inwards and vice versa.

The use of the rolling pin makes the stretching operation easier than the manual method, which will be described below, however it causes a greater loss of the leavening gases in the mixture, which are particularly important for the success of the final product because these are responsible for the growth of the dough in the oven.

A further method consists of stretching the dough by hand.

Firstly, with such method it is necessary to dust the hands and work plane with flour, then, press gently in the middle of the mixture using the fingers to favour the direction of the leavening gases towards the edge.

Then, stretch the dough slowly and thoroughly, working from the middle outwards, without compressing it peripherally, to avoid making a disc of dough devoid of an edge.

Next, continue to expand the dough, making it rotate on itself and turning it over frequently, each time adding flour to the plane.

Such method is the one used at home and in home-cooking restaurants, comprising a moderate number of place settings.

Although such manual technique allows a tasty product to be obtained, with a typical home-made shape, it requires lengthy production times.

Such drawback is particularly felt in restaurants where the chef/pizza-maker not only has to cook, but also stretch the dough.

As is known, the dough cannot be stretched before the actual request is made at the table, to prevent the taste and crispiness of the final product from ruining.

It follows that at some times of the day, the so-called rush hour, the presence of a greater number of operators is required to stretch the dough and cope effectively with the consumer demand and improve the restaurant's production times.

Furthermore, when the stretching of the flat food dough is carried out on an industrial level, the production time is a parameter inversely proportionate to profit and therefore, must be kept, as far as possible, to limited values.

Thus, the use of professional automatic machines for stretching food dough has become established in recent years.

One known dough-stretching machine has one or more rollers with an adjustable thickness, between which the mass of dough is inserted.

To favour the entry of the mass between the rollers it is necessary to compress the mass gently beforehand, which then gradually becomes thinner due to subsequent passages in the rollers.

Disadvantageously, such machine has the drawback that after the use thereof, the stretched dough still needs to be finished manually, to guarantee a home-made appearance and oxygenate the product before filling.

One executive variation of the roller machine described above is provided with a plurality of inclined rollers and a hook configured to round the mass of dough.

In particular, a first roller stretches the mixture, which then falls onto the hook and performs a rotation, so as to guide the mixture towards a second larger roller below. The dough, thus processed, assumes a rounded shape with a limited thickness.

Inconveniently, also for such machine, a final hand finish needs to be carried out to ensure the quality of the product.

Another drawback of such machine is that it is not suitable to use for pizzas with a thick edge, the so-called crust, such as, for example, Neapolitan pizzas.

Another executive variation of the roller machine has a multiplicity of rollers with a parallel development, which allows the dough to be stretched according to a rectangular profile.

Inconveniently, such machine is not adapted to make dough with a discoid shape because in this case the operator needs to perform the rotation of the dough in the various passages between one roller and another.

A further dough-stretching machine of the known type is the dough-stretching machine described in document EP 1129621. Such machine comprises a shaft mounted vertically to a support structure, connected at the lower end thereof to radial arms, which perform the stretching of the mass of dough. Furthermore, being mechanically associated with rotation mechanisms designed to cause the rotation of the shaft about the central axis of symmetry thereof, the shaft creates the rolling of the mass of dough over the surface where the latter is resting.

Disadvantageously, however, also such dough-stretching machine is not suitable for making a pizza with a thick crust and a home-made appearance.

A further dough-stretching machine belonging to the prior art is provided with a mechanical manipulator comprising a plurality of extenders, which are moveable according to the radial direction.

With such dough-stretching machine, the already partially flattened mass of dough is arranged below the extenders so as to allow the insertion thereof in the middle of the mixture from where, by means of a radial outward movement, such extenders perform the stretching thereof by pulling.

The radial movement of the extenders is allowed by the particular structural configuration of movement means associated therewith, which comprise, in particular, an integrally rotating actuator connected to a rotatable disc on the surface of which a plurality of helicoid slits are defined.

Additionally, they comprise a plate arranged below the rotatable disc, on the surface of which a plurality of radial slits are defined.

The rotation of the rotatable disc, and thus the movement of the helicoid slits defined therein, causes the movement of a pin associated with extension means, which are associated, in turn, with the extenders.

In fact, such pin is arranged through the helicoid slits and the radial slits so that the rotation of the disc causes the displacement of the aforesaid pin along the helicoid slits according to the direction of development of the radial slit, causing the movement of the extenders associated therewith, from the centre of the plate towards the outer edge thereof.

One first drawback of such dough-stretching machine consists of the fact that the radial movement of the extenders is carried out by means of a complex structural solution, which makes both the production and maintenance of the aforesaid machine particularly difficult over time.

Another drawback related to the aforesaid machine regards the quality of the final product obtained.

In fact, the disc of dough is stretched by pulling the dough, by means of the extenders, which, immersed in the mixture, move part of the mass of dough from the centre outwards, forming the so-called crust.

In this way, it is possible to obtain a thick outer edge, but a thin central part, which can break easily when subjected to traction, accidentally creating holes in the final product.

SUMMARY OF THE INVENTION

The present invention aims to overcome all of the stated limitations and drawbacks.

In particular, it is an object of the present invention to make a dough-stretching machine for stretching food dough, which is easy to produce and maintain.

Again, it is an object of the present invention that the aforesaid dough-stretching machine allows the realisation of planar shapes of food dough, starting from masses of mixture, without having to include a previous operation of compressing the mixture.

It is a further object of the present invention to produce a machine, which performs the stretching of the food dough according to movements substantially corresponding to those made with the manual method, so as to obtain a final product, which looks as home-made as possible.

It is also an object of the present invention that the product obtained from the aforesaid machine does not require a successive step of manual finishing.

The stated objects are achieved with the realisation of a dough stretching machine for stretching food dough according to the main claim.

Further features of the machine are described in the dependent claims.

BRIEF DESCRIPTION OF THE DRAWINGS

The aforesaid objects, together with the advantages, which will be mentioned hereinafter, will be highlighted during the description of a preferred embodiment of the invention, given by way of a non-limiting example with reference to the attached drawing tables, where.

DETAILED DESCRIPTION OF THE PREFERRED EMBODIMENTS

Figure 1:
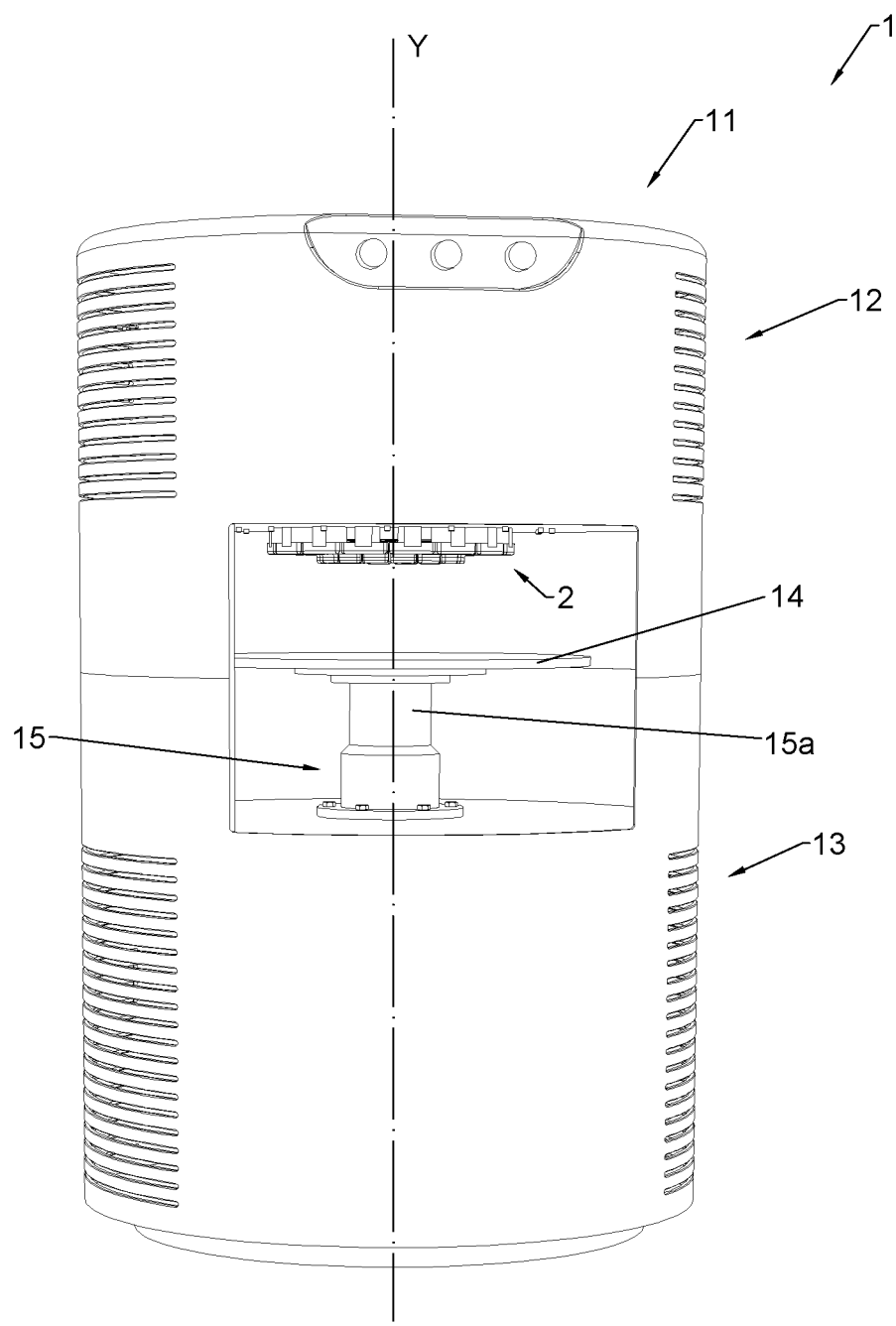
FIG. 1 represents an axonometric view of the dough-stretching machine of the invention according to a preferred embodiment.

The dough-stretching machine, which is the subject of the invention, is represented in FIG. 1 where it is globally denoted with number 1.

The dough-stretching machine 1 of the present invention is particularly adapted to stretching dough for foodstuffs, such as, for example, pizzas, wraps, focaccia bread, Arab and pita bread.

In particular, such dough-stretching machine 1 is advantageously useful for performing the stretching of dough for making pizzas in commercial and industrial businesses and restaurants and in all those places where a mass of dough needs to be stretched in quick times, while preserving the quality obtained when the operation of stretching is carried out manually by an operator.

The dough-stretching machine 1 of the present invention comprises a frame 11, which identifies a vertical axis Y and it is preferably provided with two portions: a first upper portion 12 and a second lower portion 13, which are coaxial to each other according to the aforesaid vertical axis Y.

A support plane 14 for the mass of dough to be stretched is associated with the frame 11, and in particular with the second lower portion 13, and a dough-stretching unit 2 arranged at the top and coaxially to the support plane 14 according to the vertical axis Y is associated with the first upper portion 12. Movement means 15 for moving the support plane 14 towards/away from the dough-stretching unit 2 are also associated with the frame 11.

In particular, as shown in FIG. 1, the dough-stretching unit 2 is arranged at least partially inside the first portion 12 while the movement means 15 of the support plane 14 are preferably arranged at least partially inside the second portion 13.

Preferably, but not necessarily, the dough-stretching unit 2 and/or the movement means 15 comprise one or more scraper elements, not shown in the figures, which prevent flour and other foreign solid or liquid bodies from entering the first and second portion 12, 13 so as to guarantee the cleaning and good working of the mechanisms arranged inside such two portions.

According to the preferred embodiment of the invention, the movement means 15 are of the type known per se and comprise a telescopic shaft 15a, shown in FIG. 1, for lifting the support plane 14 towards the dough-stretching unit 2. Such movement means 15 can be variously configured and they are preferably operatively coordinated with the dough-stretching unit 2, as will be described later in detail below.

It is not excluded that, according to one executive variation of the present invention, such movement means 15 can also comprise sensors adapted to define and/or signal the position of the support plane 14 along the vertical axis Y.

One example, which shall not be considered limiting, of the aforesaid movement means 15 comprises the presence of an electric gear-motor configured to transmit the rotary motion to an eccentric connecting rod mechanism, which, transforming it into linear motion, regulates the movement of the support plane 14 on lifting or lowering by means of the telescopic shaft 15a.

According to the preferred embodiment of the invention, the support plane 14 is moved according to the vertical direction according to the axis Y, however, it is not excluded that according to alternative embodiments of the invention, such movement can be of the horizontal or mixed type.

As regards the dough-stretching unit 2 of the invention, it comprises a modelling body 21 configured to come into contact with the mass of dough to be stretched.

Figure 9:
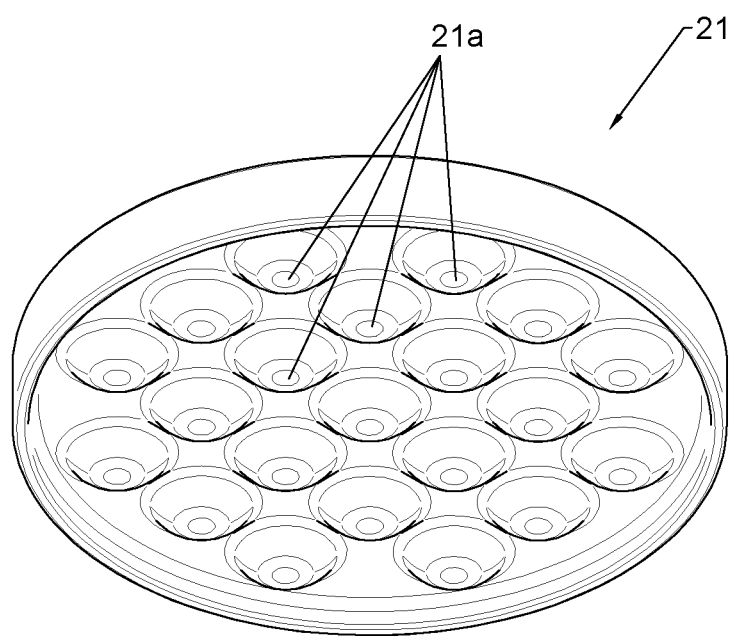
FIG. 9 represents an axonometric view from below of the modelling body of the invention.

According to the preferred embodiment of the invention, the modelling body 21 comprises a shaped plate provided with a plurality of protruding elements 21a each having a convex outer profile facing the support plane 14 and adapted to come into contact with the mass of dough to be stretched, as shown in FIG. 9.

Advantageously, the modelling body 21 is configured so that it exerts a pressure on the mass of dough to be stretched, favouring an optimum distribution of the leavening gases contained therein.

Again, advantageously, the protruding elements 21a reproduce the shape of the operator's fingers so that the pressure exerted by the modelling body 21 on the mass of dough imitates the movement of the operator's fingers, stretching a mass of dough, thus realising a final product as similar as possible to that obtained by hand according to the manual method.

However, it is not excluded that according to alternative embodiments of the invention, such protruding elements 21a can have a different shape from that indicated previously.

Again, it is not excluded that such modelling body 21 is devoid of such protruding elements 21a and has a smooth or rough planar shape.

Going back to the dough-stretching unit 2 of the invention, it also comprises a plate 22, in which a plurality of radial grooves 22a are identified, each of which slidably houses a modelling element 3 configured to stretch the mass of dough.

Such plate 22 is preferably a fixed plate.

Again, preferably, the aforesaid plate 22 further comprises a plurality of through holes having equal or different dimensions from one another, which are adapted to allow the passage of elements configured to promote the displacement of the modelling body 21 and which will be described later in detail.

The dough-stretching unit 2 further comprises kinematic means 4 adapted to move the modelling elements 3 along the radial grooves 22a towards the vertical axis Y or away from the vertical axis Y itself.

Figure 4:
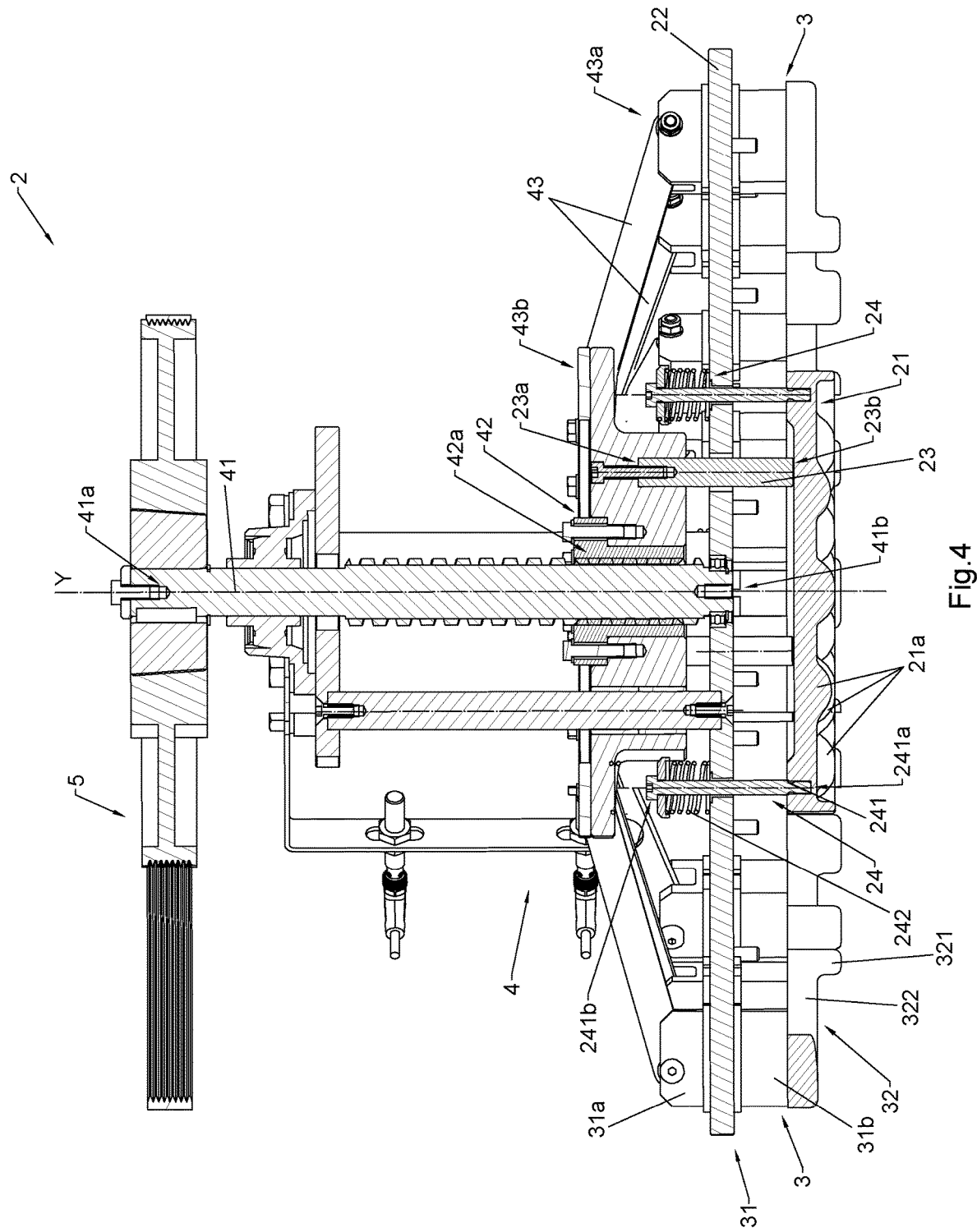
FIG. 4 represents a sectioned side view of the dough-stretching unit of FIG. 3 according to the section line IV-IV.
Figure 5:
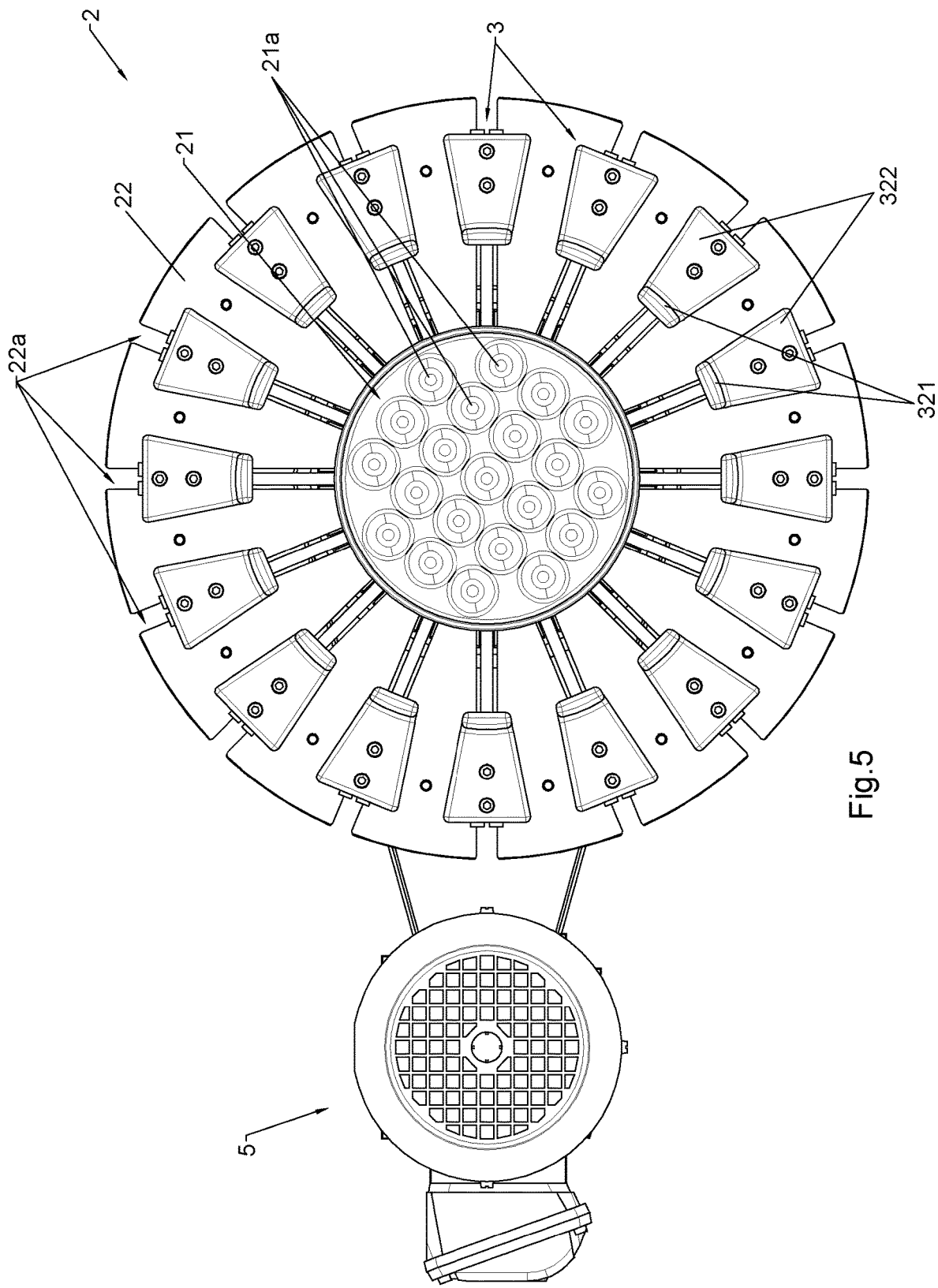
FIG. 5 represents a view from below of the dough-stretching unit of FIG. 3.
Figure 6:
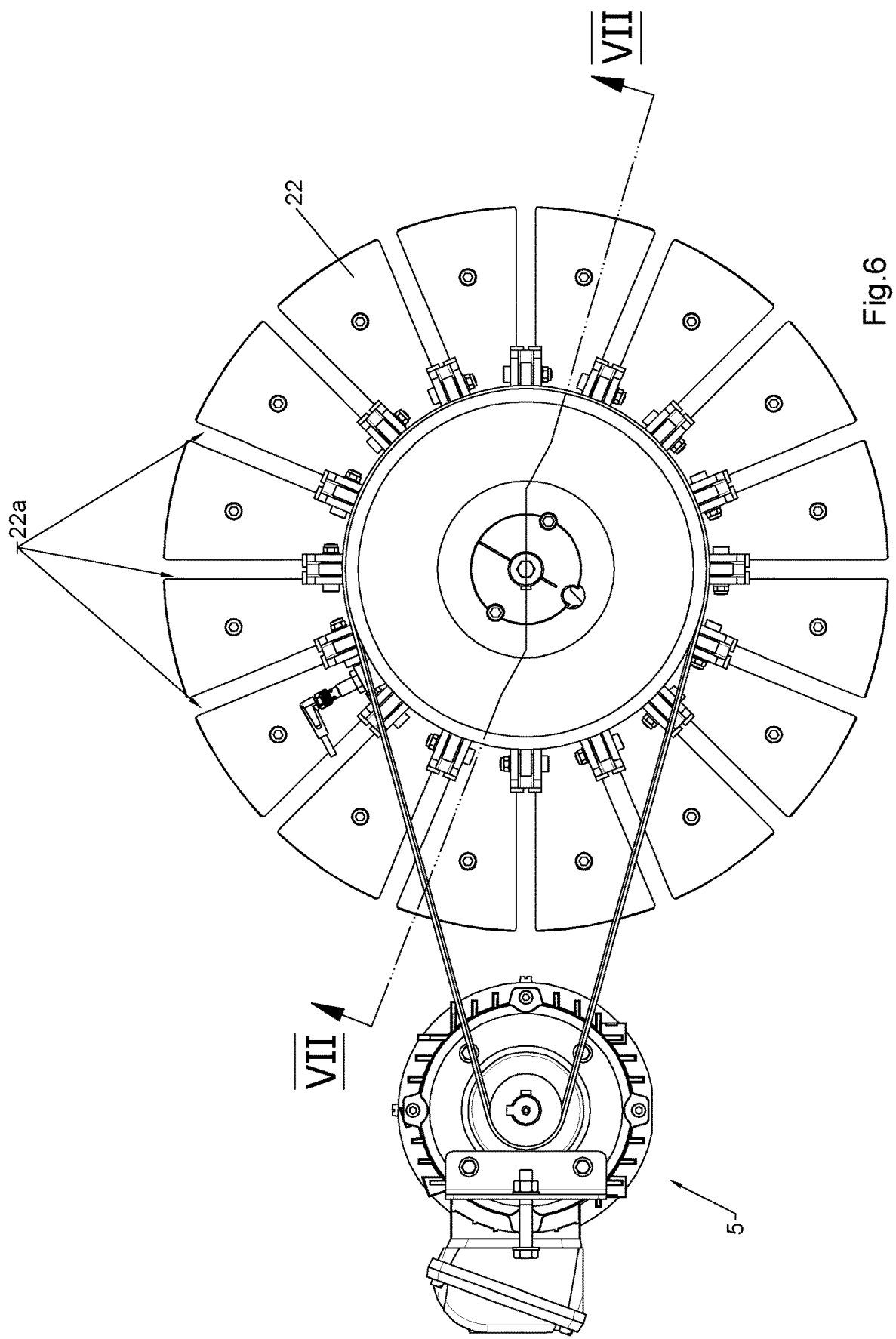
FIG. 6 shows a view from above of the dough-stretching unit of FIGS. 2a and 2b when the modelling elements are in the central position.
Figure 7:
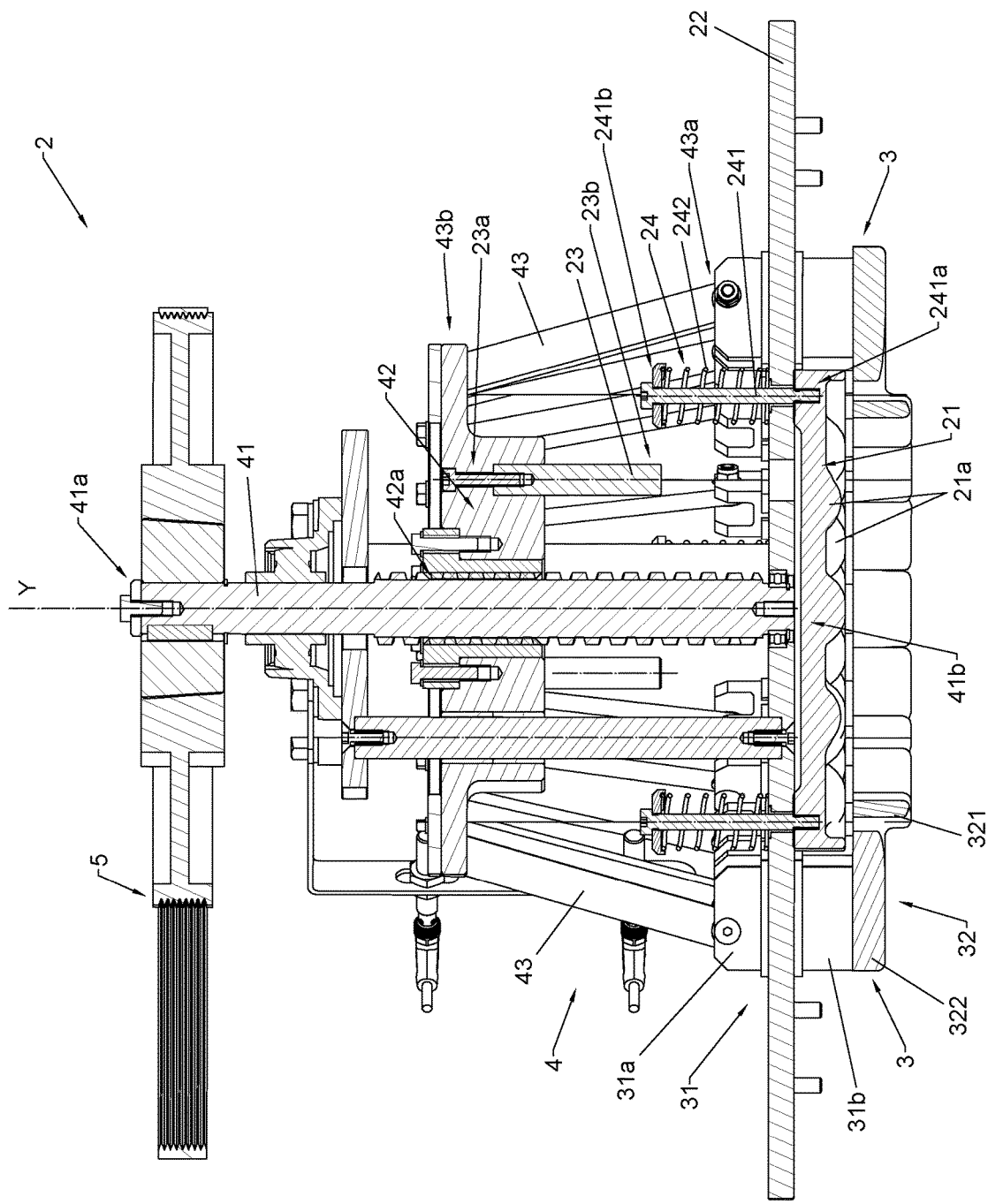
FIG. 7 represents a sectioned side view of the dough-stretching unit of FIG. 6, according to the section line VII-VII.
Figure 8:
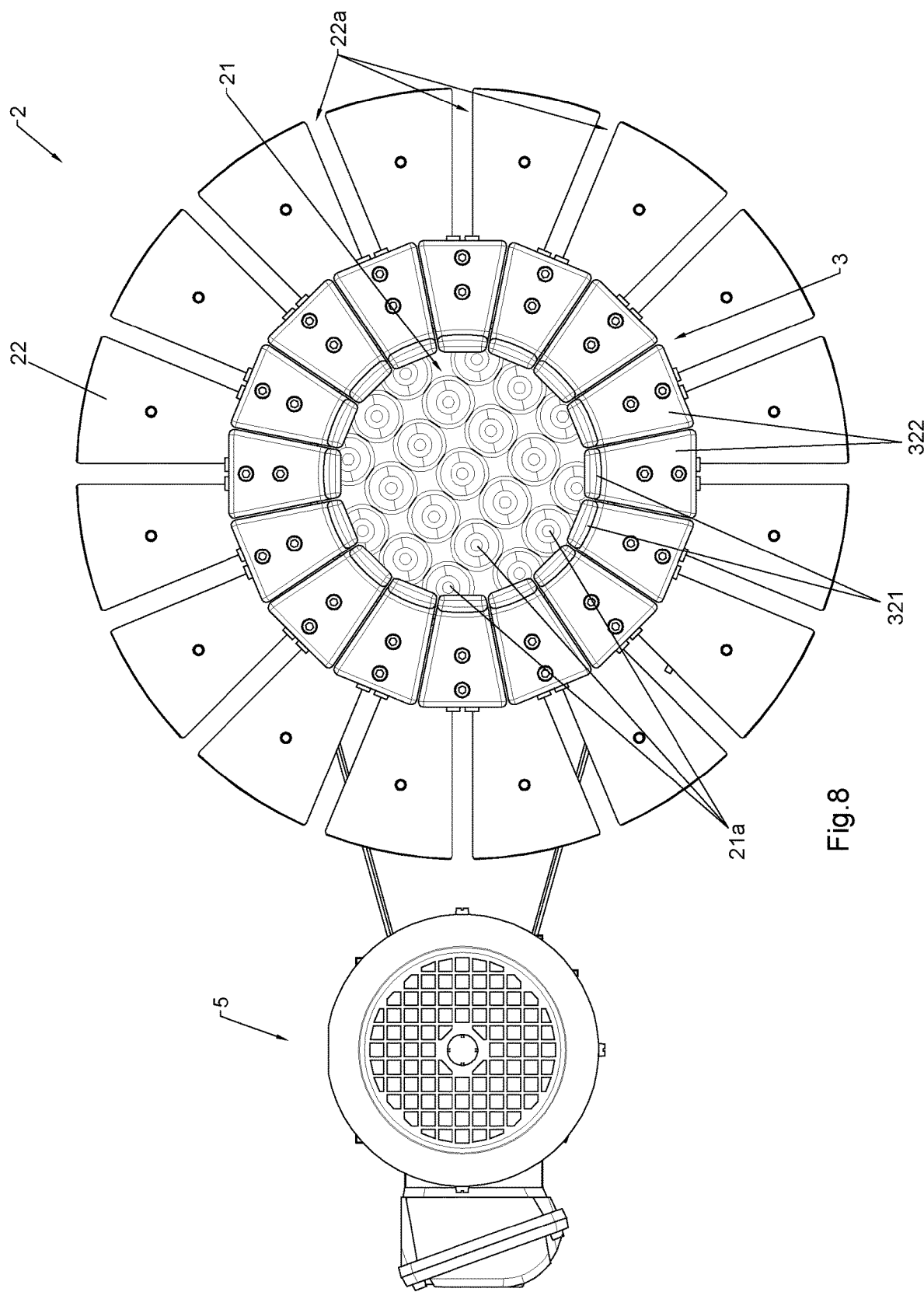
FIG. 8 shows a view from below of the dough-stretching unit of FIG. 6.

In particular, as can be seen in the section in FIGS. 4 and 7, the kinematic means 4 comprise a threaded shaft 41 having one end 41a operatively connected to motorisation means 5 and the opposite end 41b rotatably associated with the aforesaid plate 22.

Furthermore, the kinematic means 4 comprise a central core 42 provided with a nut 42a fixed on the threaded shaft 41 and a plurality of rods 43 each having one end 43a hinged to one of the modelling elements 3 and the opposite end 43b hinged to the central core 42.

Preferably, but not necessarily, the kinematic means 4 further comprise sensors configured to identify and/or signal the position of the central core 42 along the vertical axis Y.

Advantageously, such kinematic means 4 are configured to realise a compass movement of the plurality of rods 43 and the consequent displacement of the modelling elements 3 towards the vertical axis Y or away from the vertical axis Y itself.

It is specified that a compass movement is understood to mean a movement assimilable with the movement of the rods of a compass in which the fulcrum is arranged at the central core 42.

In detail, the compass movement is realised when the motorisation means 5 set the threaded shaft 41 in rotation, causing the downward or upward displacement of the central core 42 depending on the direction of rotation of the threaded shaft 41 and the consequent movement of the end 43a of each rod 43 and of the modelling element 3 hinged thereto, according to the direction of development of the radial grooves 22a of the plate 22.

Advantageously, the particular geometric configuration of the dough-stretching unit 2 and the characteristic compass movement of the present invention allow the modelling elements 3 to be moved at a varying speed.

In detail, in fact, due to the particular rod system 43, the radial speed of the modelling elements 3 gradually decreases as the edge of the plate 22 approaches.

Such feature allows a more delicate modelling of the mass of dough to be obtained with respect to the dough-stretching machines of the prior art, further preventing the tearing and/or stressing of the mass of dough being stretched.

As shown in FIGS. 4 and 7, according to the preferred embodiment of the invention, each modelling element 3 comprises a sliding body 31 arranged through a corresponding radial groove 22a of the plate 22 and having a first part 31a arranged above the plate 22 and hinged to one of the rods 43 and a second part 31b arranged below such plate 22 and associated with a shaped body 32 for the stretching of the mass of dough. As can be seen better in FIGS. 2b and 2d, the shaped body 32 has an L-shaped profile in which a larger side 322 is identified, associated with the second part 31b of the sliding body 31 and a smaller side 321 adapted to be at least partially immersed in the mass of dough according to the methods which will be described below in further detail.

However, it is not excluded that according to alternative embodiments of the present invention, the modelling element 3 has a different configuration from the one specified provided that it comprises at least one portion suitable for interacting and promoting the stretching of the mass of dough to be stretched when the central core 42 is lowered and the plurality of rods 43 extends according to what was indicated previously.

According to the preferred embodiment of the invention, the dough-stretching unit 2 also comprises means for displacing the modelling body 21, shown in FIGS. 4 and 7, comprising at least one thrust pin 23 having one end 23a associated with the central core 42 and the opposite end 23b adapted to come into contact and push the modelling body 21 downwards according to the vertical direction Y and towards the support plane 14, when the central core 42 is lowered.

In particular, the displacement of the modelling body 21 is promoted by the contrast of the latter with the aforesaid thrust pin 23, which, during the lowering movement of the central core 42, passes through one of the through holes present on the plate 22 and thrusts the modelling body 21 towards the support plane 14.

Advantageously, such displacement movement of the modelling body 21 is regulated by an elastic unit 24, which preferably comprises a pin 241 arranged through the plate 22 and having one end 241a associated with the modelling body 21.

A manoeuvring head is defined at the opposite end 241b of the pin 241 and an elastic element 242 is arranged externally to the pin 241 and comprised between the aforesaid manoeuvring head and the plate 22.

As represented in the section in FIG. 7, when the modelling elements 3 are in the central position, i.e., when the latter are substantially arranged in the middle of the plate 22 close to the vertical axis Y, the central core 42 is in the raised position with respect to the plate 22 with the thrust pin 23 having the end 23b free.

Furthermore, in such position, the elastic element 242 of the elastic unit 24 is in the rest configuration and exerts an elastic force on the manoeuvring head, which is such as to contrast the weight of the modelling body 21 and keep the pin 241 and the modelling body 21 associated therewith in the raised position.

The term "raised position" is understood to mean the position in which the modelling body 21 is close to the lower surface of the plate 22 facing the support plane 14. Preferably, in such raised position, the plate 22 has at least one section of the lower surface thereof in contact with the aforesaid modelling body 21.

Operatively, when the threaded shaft 41 is set in rotation by the motorised means 5, the nut 42a of the central core 42 causes the displacement of the central core 42 towards the plate 22 below and displaces the thrust pin 23 through the through hole until it comes into contact with the modelling body 21. The end 23b of the thrust pin 23 contrasts with the upper surface of the modelling body 21 and pushes it towards the support plane 14 to press the mass of dough to be stretched, resting thereon.

Once the mass of dough has been pressed, the inversion of the direction of rotation of the threaded shaft 41 causes the lifting movement according to the direction of the vertical axis Y of the central core 42 and brings the thrust pin 23 into the position in which the end 23b is free from contact with the modelling body 21.

Consequently, on termination of the thrust of the thrust pin 23 on the modelling body 21, the elastic element 242 of the elastic unit 24 returns to the rest configuration, thus bringing the modelling body 21 back into the raised position.

Advantageously, the lowering movement of the modelling body 21 to press the mass of dough to be stretched allows the dough-stretching machine 1 of the invention to stretch a mass of dough without having to previously include an operation of partial stretching as in the machines of the prior art.

Such advantage is particularly important when making a pizza where the mass of dough to be stretched usually has a substantially rounded shape.

The operation of the dough-stretching machine 1 is better explained by the description of a method for stretching a mass of dough, which uses the dough-stretching machine 1 according to the preferred embodiment of the invention, including the variations, which must be considered part of the present invention.

Such method is particularly suitable for stretching masses of food dough for making products, such as pizzas, wraps, focaccia bread, Arab and pita bread.

In particular, such method initially comprises arranging a mass of dough to be stretched on the support plane 14.

Such operation can be performed manually by an operator or automatically using positioning devices, which are known per se to an expert in the field.

When the mass of dough to be stretched is positioned on the support plane 14, the latter is lifted according to the vertical direction Y towards the dough-stretching unit 2 until pressing the mass of dough, at least partially, towards the modelling body 21.

Such lifting operation occurs when the dough-stretching unit 2 is configured in such a position that the plurality of rods 43 are arranged in the extended position, i.e., when the modelling elements 3 are arranged in the periphery of the plate 22 and the modelling body 21 is in the lowered position due to the effect of the thrust exerted by the contrast with the thrust pin 23 of the central core 42, as described previously and represented by way of example in FIGS. 2c, 2d and from 3 to 5.

Advantageously, when the mass of dough is pressed on the modelling body 21, the protruding elements 21a press on the mass of dough, favouring the distribution of the leavening gases of the mass, further reproducing the shape of an operator's fingers, imitating the movement of the same operator's fingers, stretching a mass of dough in a home-made manner with the manual method.

Following such pressing operation, the method of the invention comprises lowering the support plane 14 with respect to the modelling body 21 according to the vertical direction Y and, successively or at the same time as such operation, lifting the central core 42 by rotation of the threaded shaft 41 so as to also lift the ends 43b of the plurality of rods 43, which are hinged to the central core 42, causing the compass movement thereof on closing and, thus the sliding of the modelling elements 3 hinged to the ends 43a of the aforesaid rods 43 towards the vertical axis Y along the radial grooves 22a of the plate 22.

Figure 2A:
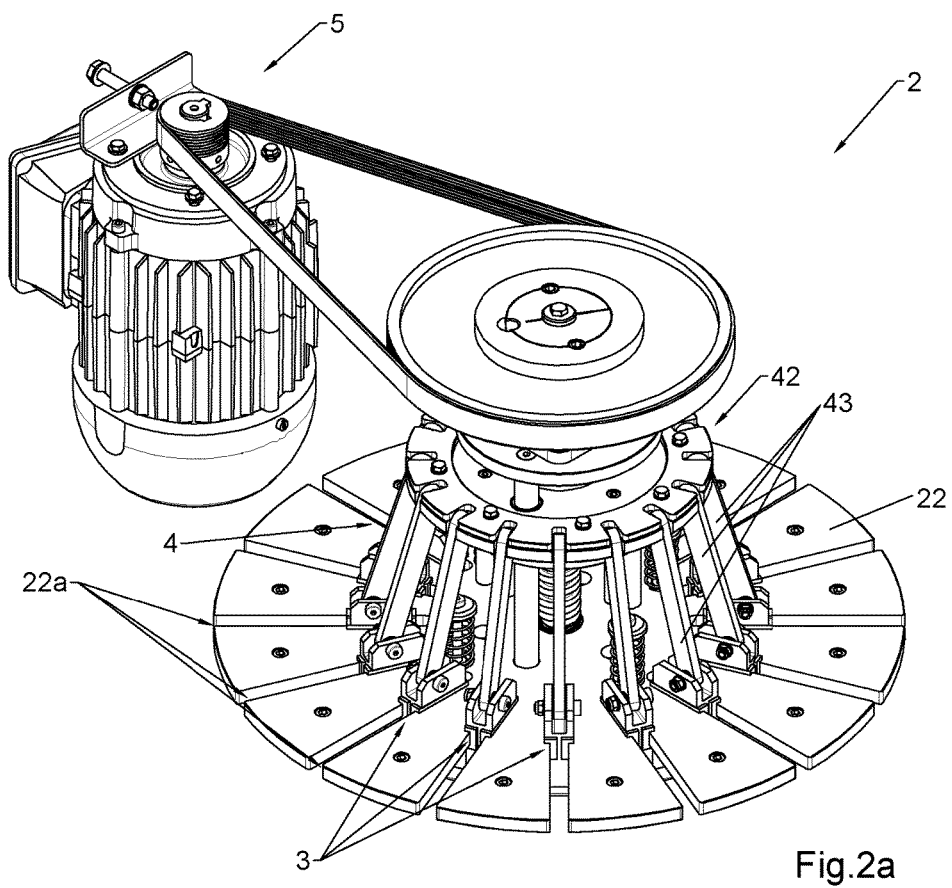
FIG. 2a shows an axonometric view from above of the dough-stretching unit of the machine of the invention of FIG. 1 when the modelling elements are in the central position.
Figure 2B:
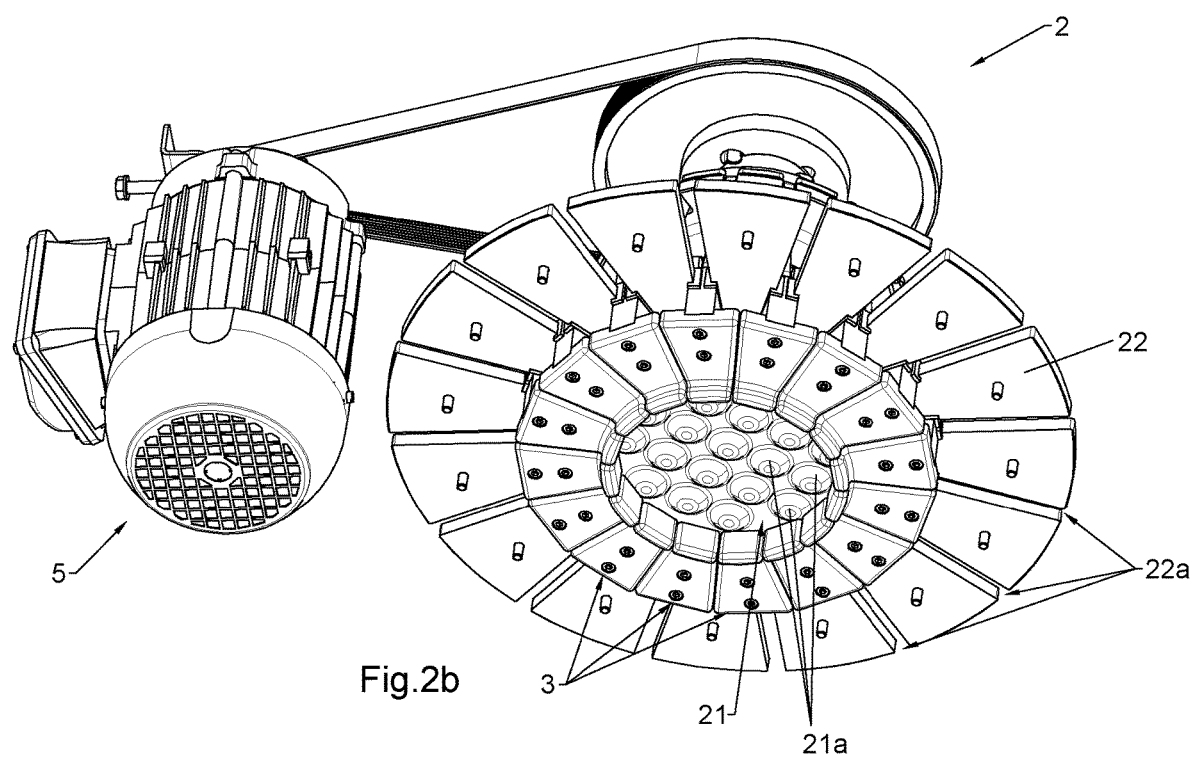
FIG. 2b represents an axonometric view from below of the dough-stretching unit of FIG. 1 when the modelling elements are in the central position.
Figure 2C:
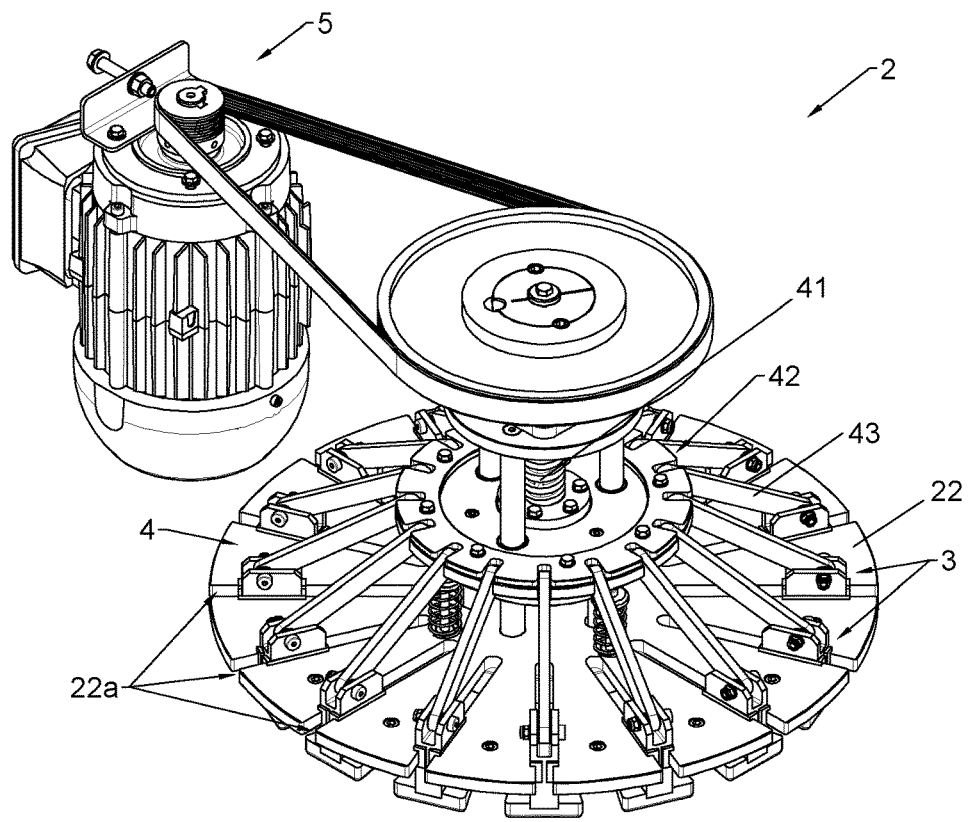
FIG. 2c shows an axonometric view from above of the dough-stretching unit of the machine of the invention of FIG. 1 when the modelling elements are in the extended position.
Figure 2D:
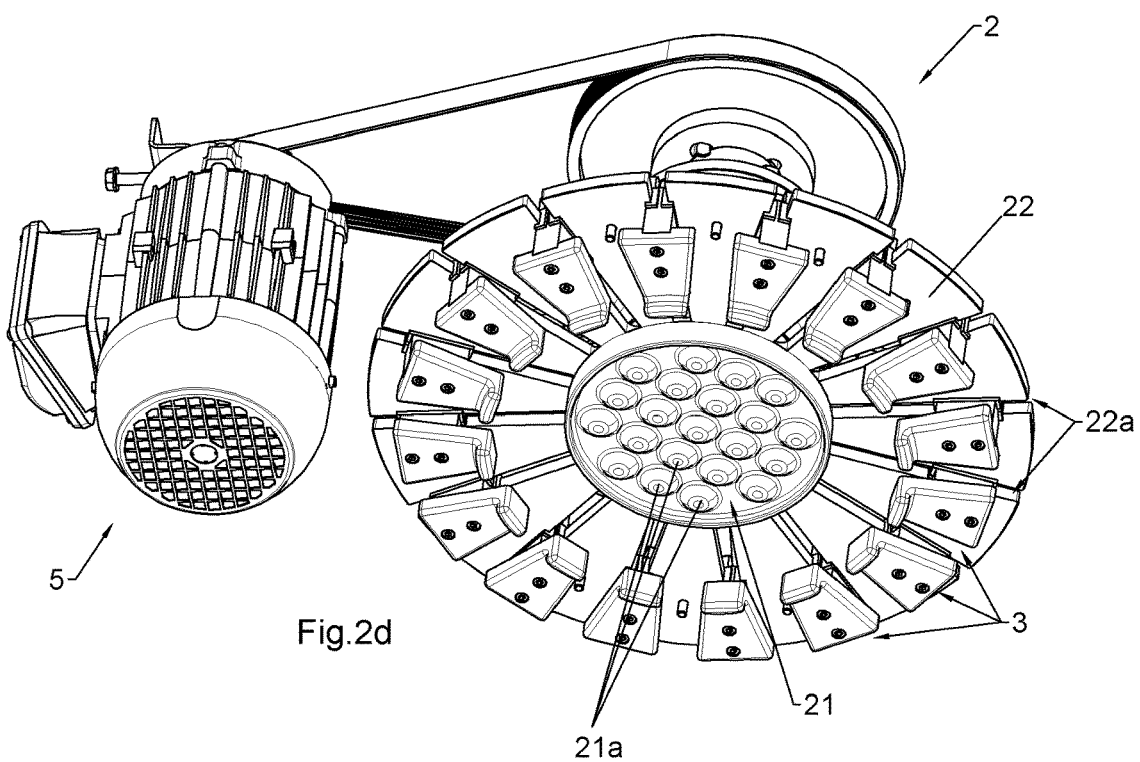
FIG. 2d represents an axonometric view from below of the dough-stretching unit of FIG. 1 when the modelling elements are in the extended position.
Figure 3:
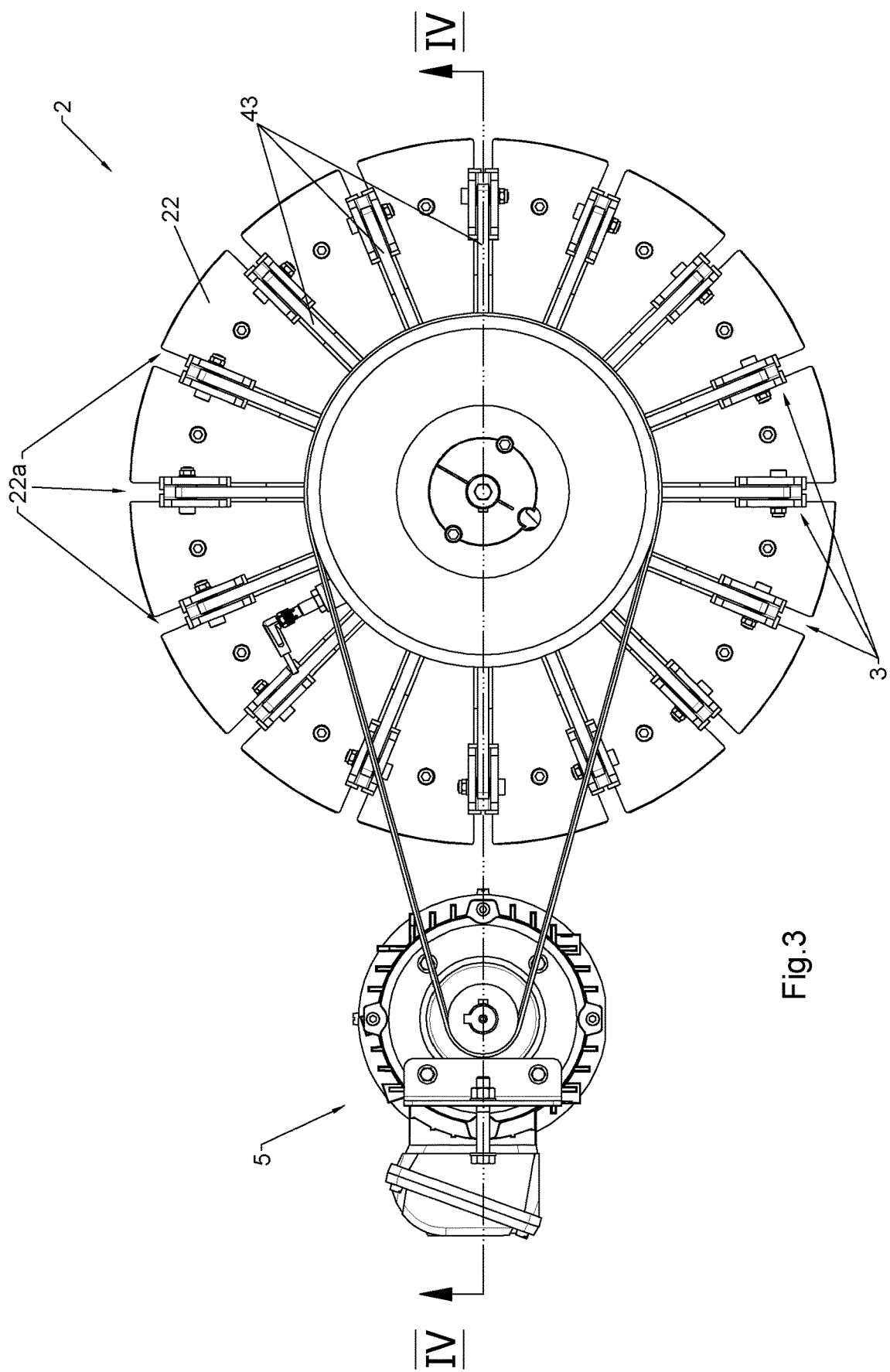
FIG. 3 shows a view from above of the dough-stretching unit of FIGS. 2c and 2d when the modelling elements are in the extended position.

The configuration of the dough-stretching machine 1 having the modelling elements 3 in the central position, substantially at the vertical axis Y, is shown by way of example in FIGS. 2a, 2b and from 6 to 8.

Going back to the method of the invention, it subsequently comprises lifting the support plane 14 according to the vertical direction Y towards the dough-stretching unit 2 until the modelling elements 3 are at least partially immersed in the mass of dough.

Preferably, such lifting is carried out until the smaller side 321 of the shaped body 32 of the modelling element 3 is at least partially immersed in the mass of dough to be stretched.

Successively, the central core 42 is lowered by means of rotating the threaded shaft 41 so as to extend the plurality of rods 43 and move the modelling elements 3 towards the periphery of the plate 22 so that the shaped body 32 of each modelling element 3 moves part of the mass of dough radially towards the periphery of the plate 22 so as to stretch such mass of dough, preferably forming a disc of dough.

Even more preferably, the radial movement of such modelling elements 3 is predefined so that part of the mass of dough is moved towards the periphery of the plate 22 and forms a thick edge of dough at the perimeter of the mass of stretched dough.

The creation of such thick edge is particularly advantageous in operations of stretching a mass of dough to make the so-called Neapolitan pizzas, provided with an outer dough crust.

Preferably, once the mass of dough has been stretched, the method comprises a further operation of lowering the support plane 14 so as to allow the operator or an automatic device to take the mass of stretched dough and direct it towards other possible operations to make the final product, such as, for example, operations of filling, cooking, packaging, etc.

It is specified that the operations of lifting and lowering the support plane 14 are preferably carried out by the movement means 15.

Thus, according to the above, the dough-stretching machine of the invention achieves all of the predetermined objects.

In particular, due to the simple rod configuration of the dough-stretching unit, the object of making a dough-stretching machine for stretching food dough, which is easy to produce and maintain, is achieved.

Again, the dough-stretching machine of the invention allows planar shapes of food dough to be made, starting from relatively compact masses of dough, such as, for example, substantially rounded shapes of mixture for pizzas, without having to include a previous operation of compressing the mixture itself.

Furthermore, due to the modelling elements and the modelling body, the dough-stretching machine of the present invention stretches the food dough according to movements substantially corresponding to those achieved with the manual method, thus allowing a final product to be obtained, which looks as home-made as possible.

Last but not least, the product obtained by the method for stretching dough, which uses the dough-stretching machine of the present invention does not require a successive step of manual finishing with a consequent saving in time.

The invention claimed is:

1. A dough-stretching machine for stretching a mass of dough, comprising:
    a frame having a vertical axis extending therethrough;
    a support plane for the mass of dough to be stretched upon during operation, said support plane being disposed within said frame and having said vertical axis pass therethrough;
    a dough-stretching unit disposed above said support plane along said vertical axis of said frame;
    movement means for moving said support plane towards or away from said dough-stretching unit;
    said dough-stretching unit comprising:
        a modelling body configured to come into contact with said mass of dough during operation;
        a plate having a plurality of radial grooves, each of said plurality of radial grooves slidably housing a modelling element;
        kinematic means adapted to move said modelling elements along said radial grooves towards or away from said vertical axis;
    said kinematic means comprising:
        a threaded shaft having one end operatively connected to a motor and an opposite end rotatably associated with said plate, said motor being configured to rotate said threaded shaft;
        a central core provided with a nut fixed on said threaded shaft;
        a plurality of rods each having one end hinged to one of said modelling elements and an opposite end hinged to said central core;
    wherein said modelling elements are displaced towards or away from said vertical axis when said threaded shaft is rotated by said motor, said threaded shaft causing a downward or upward displacement of said central core depending on a direction of rotation of said threaded shaft.

2. The dough-stretching machine according to claim 1, wherein said dough-stretching unit comprises means for displacing said modelling body comprising at least one thrust pin having one end associated with said central core and an opposite end adapted to push said modelling body when said central core is lowered, and an elastic unit for controlling the displacement of said modelling body when said modelling body is moved.

3. The dough-stretching machine according to claim 1, wherein said elastic unit comprises a pin arranged through said plate and having one end associated with said modelling body and a manoeuvring head being defined at an opposite end; an elastic element being arranged externally to said pin and disposed between said manoeuvring head and said plate.

4. The dough-stretching machine according to claim 1, wherein said modelling body comprises a shaped plate provided with a plurality of protruding elements, each having an outer convex profile facing said support plane and adapted to come into contact with said mass of dough to be stretched during operation.

5. The dough-stretching machine according to claim 1, wherein said modelling elements comprises a sliding body arranged through an equivalent of said radial grooves and having a first part arranged above said plate and hinged to one of said rods and a second part arranged below said plate and associated with a shaped body for stretching said mass of dough during operation.

6. The dough-stretching machine according to claim 5, wherein said shaped body has an L-shaped profile in which a larger side is identified, associated with said second part of said sliding body and a smaller side adapted to be immersed, at least partially, in said mass of dough during operation.

7. A method for stretching a mass of dough using the dough-stretching machine according to claim 1, comprising the following operations:
    providing the mass of dough to be stretched on said support plane;
    lifting said support plane according to said vertical direction towards said dough-stretching unit until pressing said mass of dough at least partially towards said modelling body when said dough-stretching unit is configured in such a position that said plurality of rods are arranged in the extended position and said modelling elements are arranged in the periphery of said plate;
    lowering said support plane with respect to said modelling body according to said vertical direction;
    lifting said central core by rotating said threaded shaft so that said modelling elements slide along said radial grooves towards said vertical axis;
    lifting said support plane according to said vertical direction towards said dough-stretching unit until immersing said modelling elements at least partially into said mass of dough;
    lowering said central core by rotating said threaded shaft to extend said plurality of rods and move said modelling elements towards a periphery of said plate so as to stretch said mass of dough.

8. The method according to claim 7, wherein operation of lowering said support plane with respect to said modelling body takes place at the same time as said operation of lifting said central core by rotating said threaded shaft.

9. The method according to claim 7, wherein operation of lowering said support plane with respect to said modelling body takes place following said operation of lifting said central core by rotating said threaded shaft.

10. A dough-stretching machine for stretching a mass of dough, comprising:
- a frame having a vertical axis extending therethrough;
- a support plane for the mass of dough to be stretched upon during operation, said support plane being disposed within said frame and having said vertical axis pass therethrough;
- a dough-stretching unit disposed above said support plane along said vertical axis of said frame;
- a motorized shaft configured to selectively move said support plane towards or away from said dough-stretching unit;

said dough-stretching unit comprising:
- a modelling body configured to come into contact with said mass of dough during operation;
- a plate having a plurality of radial grooves, each of said plurality of radial grooves slidably housing a modelling element;
- a threaded shaft having one end operatively connected to a motor and an opposite end rotatably associated with said plate, the motor being configured to rotate the threaded shaft;
- a central core being threadedly engaged with said threaded shaft;
- a plurality of rods each having one end hinged to one of said modelling elements and an opposite end hinged to said central core;

wherein said modelling elements are moved towards or away from said vertical axis when said threaded shaft is rotated by said motor, said threaded shaft causing a downward or upward displacement of said central core depending on a direction of rotation of said threaded shaft.

\* \* \* \* \*